INVENTORS.
STEPHEN FRED ADLER
JANIS JOHN KEGGI
BY William T. Hough
ATTORNEY

United States Patent Office 3,511,596
Patented May 12, 1970

3,511,596
METHOD OF REMOVING AMMONIA AND METHANOL FROM GASES
Stephen Fred Adler and Janis John Keggi, South Norwalk, Conn., assignors to American Cyanamid Company, Stamford, Conn., a corporation of Maine
Filed Sept. 17, 1965, Ser. No. 488,044
Int. Cl. B01d 53/04; C01c 1/12
U.S. Cl. 23—2  3 Claims

ABSTRACT OF THE DISCLOSURE

Ammonia is removed from gases by contacting said gases with a substrate impregnated with an acid; methanol is removed from gases by contacting said gases with a substrate impregnated with a hexavalent chromium compound and both ammonia and methanol are removed from gases by contacting said gases with a substrate impregnated with a hexavalent chromium compound and an acid such as phosphoric acid and sulfuric acid.

This invention relates to the deodorization of air, and more particularly relates to (1) an article of manufacture, (2) an apparatus employing said article of manufacture, and (3) a method of employing the article of manufacture for the removal of pollutants from a gas.

There exists a continuing need for deodorizing agents and methods which employ inexpensive materials, which may be easily and practically employed, and which are more effective and/or longer lasting than deodorization agents heretofore available.

The typical deodorizing agents and the means employing such agents are conventionally useful in the vicinity of race tracks, dog pounds, veterinarian hospitals, other conventional hospitals and clinics, industrial facilities accompanied by the problem of polluted gases, automobile interiors, automobile exhaust systems, business and home air-conditioning systems, as well as being useful for special systems such as those associated with furnaces or with oven or in kitchens, to adsorb odoriferous materials.

Polluted gases containing organic materials often include both ammonia and ammonia-producing compounds. Deodorization agents previously employed have failed to effectively overcome the problem of sufficiently removing the ammonia and the ammonia-producing compounds from the gas being treated. Typical materials conventionally employed for the removal of ammonia include porous materials such as alumina, silica, kieselguhr and the like.

Similarly, conventionally employed deodorization oxidants such as permanganate oxidants, although effective in the removal of organic materials, have not proven sufficiently effective to eliminate the problem of the removal of ammonia and organic materials from polluted gases.

In the removal of either ammonia or both ammonia and ammonia-producing organic compounds, as well as other organic pollutants from polluted gases, a basic problem has been the limited capacity to adsorb the materials specific to the particular deodorization substrate employed.

It is, therefore, an object of this invention to obtain a method to effectively remove diverse pollutants from a polluted gas.

Another object is to obtain an article of manufacture employing two or more deodorization agents.

Another object is to obtain an apparatus making use of a deodorization agent for employment in a process for removing pollutants from a polluted gas.

Figure 1:
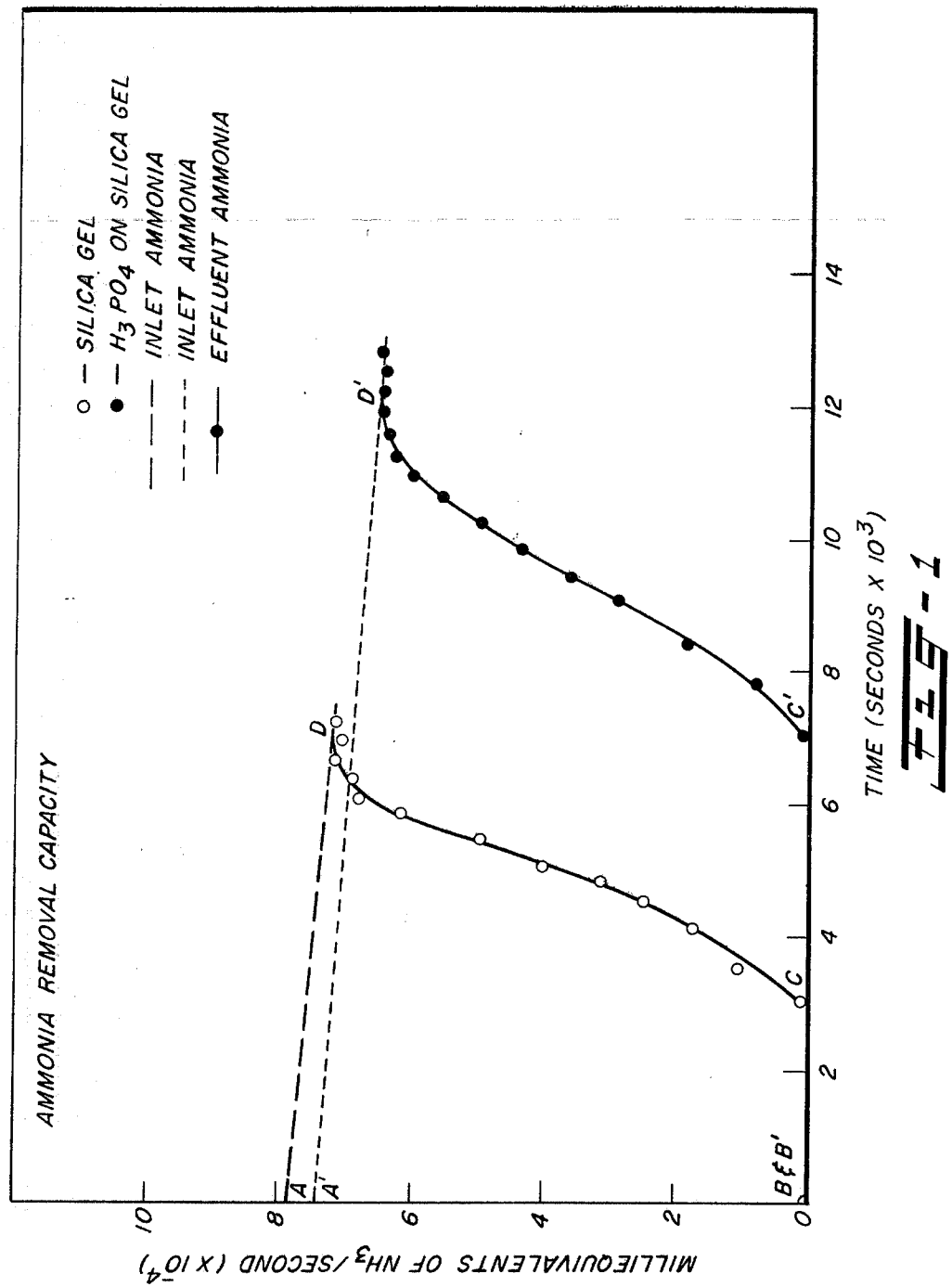
Figure 2:
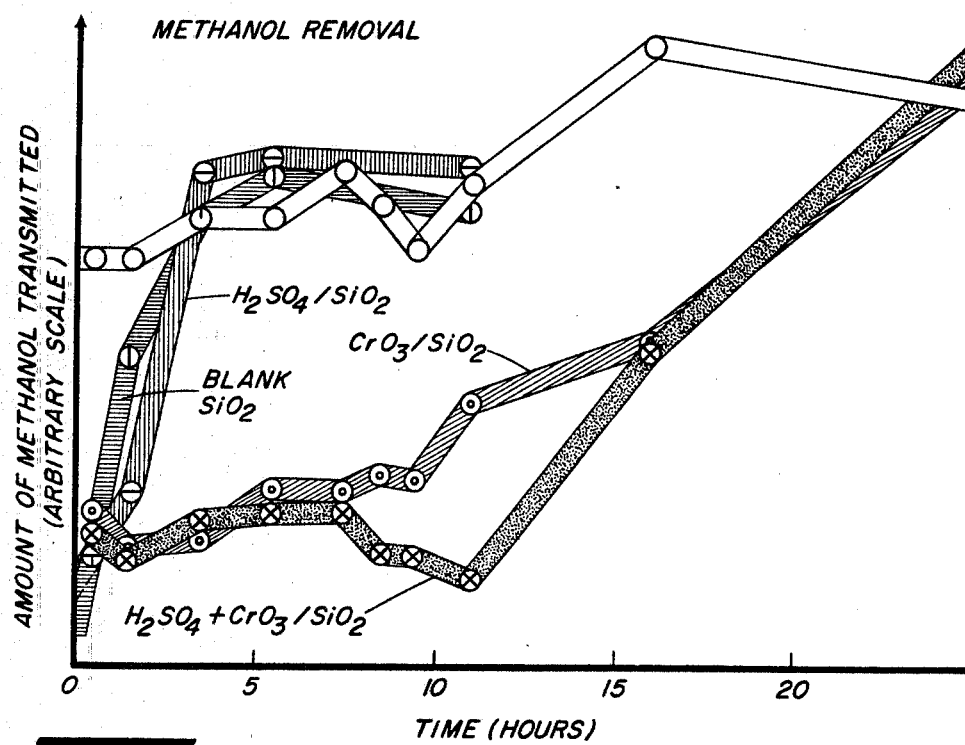
Figure 3:
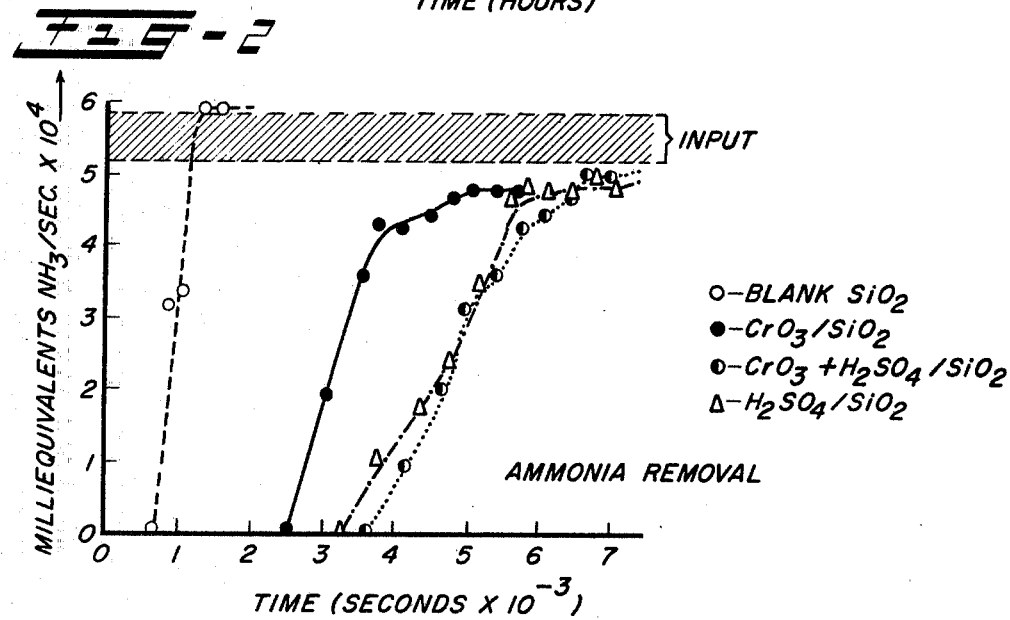

Other objects become apparent from the above and following disclosure, and the graph of the FIG. 1 illustrates the ammonia removal capacity of one embodiment of this invention, as contrasted to the prior art; FIG. 2 and 3, respectively, illustrate the superiority of the invention and the preferred embodiments for removal of organics and of ammonia, respectively. The graph is discussed in greater detail in subsequent disclosure below.

The objects of this invention are obtained by a process in which a polluted gas (such as air) is contacted with a porous substrate which has been treated with (a) a substantially nonvolatile, proton-donating material or (b) a substantially nonvolatile, proton-donating acid material and chromium oxide. The objects may be further obtained by subsequently contacting the treated gas with an alkaline material on a second porous substrate.

In the deodorization of air containing pollutants produced by decaying organic matter such as is typically found in veterinarian hospitals, conventional deodorization agents such as permanganate-impregnated substrates remove a substantial amount of the organic materials, but the treated gas continues to retain a high ammonia content, even though the impregnated substrate is normally of a porous nature and adsorbs a limited amount of the ammonia.

We have unexpectedly discovered that the ammonia-holding capacity of conventionally employed deodorization substrates may be substantially increased by the treatment of the substrate with an acidic material such as any strong acid, including sulfuric acid, phosphoric acid, hydrochloric acid, nitric acid, perchloric acid, and the like. For example, citric acid, oxalic acid, or boric acid, may be employed as the acidic material. Also, the compound of hexavalent chromium, such as $Na_2Cr_2O_7$, $K_2Cr_2O_7$, and other chromate salts may be employed in substitution for or in admixture with chromium trioxide. However, a substantial amount of the phosphoric acid (or other proton-donating mineral acid) is required to react with the dichromate salts to convert them to the preferred more active chromic acid form. Moreover, the cost, i.e., cents/electron of oxidation, is least with chromium trioxide ($CrO_3$). Perchloric acid is also comparable to chromic acid in oxidative capacity. Although perchloric acid is more expensive per pound, it undergoes a greater electron charge when it is reduced. Of these acids, hydrochloric acid and nitric acid, are typically less desirable because of their volatile nature. Similarly, perchloric acid is less satisfactory because of safety hazards involved in handling of such acids in large quantities. Sulfuric acid and phosphoric acid are the preferred acids, the latter being less corrosive and being the preferred embodiment of this invention.

Although any suitable substrate may be employed, the substrate which may be employed is limited by the fact that the substrate of the material which does not substantially react with the acidic material with which it is being impregnated. For example, most commercial aluminas are believed to be unsatisfactory as substrates to be impregnated by phosphoric acid because within a relatively short period of time the phosphoric acid will be substantially neutralized by the reaction with the alumina, whereby the beneficial effects of this invention are thereafter lost. Thus, any substrate such as a siliceous substrate or an asbestos substrate which is subtantially nonreactive with the acidic material being employed, such as phosphoric acid, may be employed for the purposes of impregnation.

A substrate impregnated with an acidic material, of the nature described above, may be employed for the deodorization of any gas containing alkaline pollutants such as ammonia and/or amines.

Representative miscellaneous substrates which may be employed for the acid include supports such as wood flour, alpha-cellulose, corn starch and the like, employed with boric acid in a glycolic medium.

The preferred embodiment of the above-described invention employs silica, a siliceous substrate, and employs phosphoric acid as the impregnating acid. By the employment of phosphoric acid in the treatment of silica, for example, the effective capacity for holding ammonia is increased from about 70% up to about 400% or more.

In another embodiment of this invention, we unexpectedly discovered that although chromium trioxide ($CrO_3$) is ineffective as a deodorization oxidant when employed alone, the chromium trioxide becomes a highly effective oxidant of organic materials when in contact with a strong mineral acid such as discussed above, provided the strong acid is an effective proton donor. For reasons discussed above, sulfuric acid, perchloric acid, and phosphoric acid are typical suitable acids, sulfuric and phosphoric being the preferred acids and phosphoric acid being the most satisfactory because of its less corrosive properties.

There are, however, physical limitations on the amounts of these acids that can be tolerated on siliceous supports and these are determined by:

(a) The total pore volume of the support.
(b) The maximum relative humidity (R.H.) expected to be encountered.
(c) The water vapor pressure equilibrium curve for the acid in question.

We shall assume that 70% R.H. is a reasonable maximum in most living quarters. Higher humidities usually occur as transients and we need only concern ourselves with "steady-state" conditions under which our materials would equilibrate themselves. We find in the literature that the following acid compositions are to be anticipated at 70% R.H.

| R.H., percent | $H_2SO_2$ | | $H_3PO_4$ | |
|---|---|---|---|---|
| | Wt. percent | Milli-moles/ml. | Wt. percent | Milli-moles/ml. |
| 70 | 34 | 4.3 | 50 | 6.7 |

That is to say, 34% $H_2SO_4$ or 50% $H_3PO_4$ will form at equilibrium at 70% R.H. If an insufficient pore volume is provided, the acid will form externally to the pores and will ultimately be free to flow out of the purifier bed and onto or into the other parts of the apparatus. Therefore, the amounts of the preferred acid are typically limited as follows: no more than 4.3 millimoles $H_2SO_4$ or 6.7 millimoles $H_3PO_4$ per milliliter of support pore volume.

Although the above embodiments of this invention are highly effective for deodorizing polluted gas, a problem arises as a result of the reaction of the pollutants with the particular acid with which the substrate has been impregnated. As the pollutants react with the acid, volatile acids are given off which tend to further pollute the gas being purified. A third embodiment of this invention is therefore desirable, employing a substrate impregnated with an alkaline material whereby the newly produced acid pollutants, as well as already present acid pollutants, are removed by contact with the alkali-impregnated substrate. The third embodiment would also have utility in purifying air already containing acid contaminate. The preferred embodiments of this invention employ an alkali-impregnated substrate by a means whereby gas to be deodorized is first contacted with (1) either (a) an acid-impregnated substrate (as described above) or (b) a substrate which has been (A) separately and consecutively, or (B) jointly impregnated with both chromium oxide and an acidic material (as described above), and subsequently contacting the gas with (2) the alkali-impregnated substrate.

In an embodiment of this invention which employs the alkali-impregnated substrate in combination with the acid-impregnated substrate, although any suitable substrate may be employed as the substrate to be impregnated by the alkaline material, suitable substrates are limited by the fact that a material must be employed which is substantially nonreactive with an alkaline material. Accordingly, alumina is a preferred substrate for impregnation with the alkaline material, while siliceous materials are less satisfactory because of the reactivity of alkaline material with siliceous materials. The alkaline material may be any conventional alkaline composition, typical but non-exclusive examples being sodium hydroxide, the perborates, etc.

Included within the scope of this invention is an article of manufacture which is the combination described above, of a first porous substrate impregnated with an acidic material, or acidic material and chromium trioxide, connected by an appropriate means to a second porous substrate impregnated with an alkaline material.

Similarly, included within the scope of this invention is an apparatus comprising (A) a means for contacting a gas (B) with a substrate impregnated with (1) an acidic material, or (2) an acidic material and chromium trioxide, or (B') with either of the two preceding substrates in combination (C) with an alkali-impregnated substrate.

In the practice of this invention, the preferred substrates are those having a high pore volume. Accordingly, any suitable commercially-available substrate such as silica or kieselguhr, or the like may be employed. Alternatively, the substrate may be specially prepared. Similarly, for the alkali-material-impregnated substrate, commercially-available alumina may be employed, for example, or the substrate may be specially prepared by any particular method.

The method of acid-impregnation of the substrate such as silica is not critical to this invention, any conventional method being suitable. Similarly, the methods of impregnating the alumina with an alkaline material are not critical to this invention, any conventional method being suitable.

For purposes of illustrating the invention, quantitative comparisons between (1) blank (control) silica gel, (2) $H_2SO_4$/silica gel, (3) $CrO_3$/silica gel, and (4) $Cr_3+H_2SO_4$/silica gel have been performed for (a) a removal of organics as illustrated in FIG. 2, and (b) a removal of ammonia, as illustrated in FIG. 3.

In FIG. 2, the $CrO_3/SiO_2$ (without acid added) performed up to a point substantially as well as it did in the $CrO_3+H_2SO_4/SiO_2$. The mechanism is believed to be different, however, in the two cases for the following reasons. In the case of the acidified material, the yellow granules turned green as would be expected from the acid reaction. The orange particles of the unacidified material turned black as the test progressed. From this data, it is concluded that the removal by the $CrO_3$ used alone is a removal by physical restraint in the nature of a filter. Although a direct comparison of the $CrO_3$ containing samples to the now $CrO_3$ sample should be approached with caution, there is no doubt about the fact that in the absence of $CrO_3$ there is merely a neglible removal of methanol.

It should further be noted that experimental evidence supports the observation that in the removal or organics from polluted air, $CrO_3/SiO_2$ (in the absence of an acid) is much more effective in the removal of methanol than in the removal of other higher organics. Therefore, the superior results of the $H_2SO_4+CrO_3/SiO_2$ illustrated in FIG. 2 is a highly significant showing.

The applicants do not intend to be bound by the above theory of the mechanism. However, the supporting data is at least evidence of the difficulty in predictability prior to applicants' invention.

The following examples illustrate typical methods of treatment of porous materials such as silica and kieselguhr, in the preparation of (1) an acid-impregnated substrate, and (2) an acid and a chromium trioxide-impregnated substrate. It should be noted at this point, that in the embodiment which included impregnation with both chromium trioxide and impregnaiton with the acid such as phosphoric acid, the impregnations may be simultaneous, or the chromium trioxide impregnation may be before or subsequent to the acid-impregnation. If the acid and the oxide impregnations are separately conducted in series, it is necessary to have an intermediate step of substantially drying after the first impregnation and before the second impregnation. Similarly, the examples illustrate a typical impregnation of a substrate with alkaline material to be employed in combination with the acid-impregnated substrate. Additionally, the following examples include a comparison of the capacity of permanganate to oxidize organic material, such as methanol, with an embodiment of this invention employing a substrate impregnated with both phosphoric acid and chromium oxide ($CrO_3$).

The following examples are intended to solely illustrate the above-described invention, and do not limit the scope thereof except insofar as the appended claims are limited.

EXAMPLE 1

Silica gel is screened to give granules of about 6–8 mesh. The water pore volume is determined to be 0.38 cc./g. A sample of this is titrated with 3.1 molar phosphoric acid until the pore volume is filled. The acid content is then 1.175 millimoles per gram of dry silica. The substrate and the impregnated material are dried at 110° C. for ca. one hour. Weighed samples of each material are then placed in a flowing $NH_3$-air stream and the effluent is checked for reisdual $NH_3$ by absorbing in HCl solution. The sample is assumed to be exhausted when the effluent $NH_3$ rate is the same as the untreated $NH_3$-air stream.

The ammonia-adsorbing capacity of the treated and untreated silica of the foregoing example is illustrated in FIG. 1, which is a plot of instantaneous leakage as a function of time for each material. It should be noted that the untreated silica adsorbs all ammonia (in terms of milli equivalents of ammonia per second [$\times 10^{-4}$] for a period of three thousand seconds and that between three thousand and seven thousand seconds, the capacity of the untreated silica to adsorb ammonia substantially decreased. In contrast thereto, the silica impregnated with phosphoric acid adsorbed all ammonia for a period of seven thousand seconds before the capacity to adsorb began to decrease between 7,000 and 12,000 seconds.

Employing the data illustrated on the graph of the figure, the capacity of untreated silica to adsorb, as represented by the graphic area within the bounds of A–B–C–D may be compared to the capacity of the phosphoric acid impregnated silica to adsorb, as represented by the graphic area bounded by A'–B'–C'–D'. A comparison of the relative capacities to adsorb ammonia, expressed in the relative graph areas, is shown in Table I below.

TABLE I

| Substrate | Graph relative area | Gross wt. (g.) | Graph Relative area per gram |
|---|---|---|---|
| Silica | 1.00 | 1.3919 | 0.72 (100%) |
| $H_3PO_4/SiO_2$ | 1.79 | 1.4683 | 1.22 (171%) |

Thus, Table I above illustrates the integrated area under each curve as a measure of the ammonia adsorption capacity. From the table it can be seen that a net 71% increase in capacity for holding ammonia resulted from the impregnation of the silica with the phosphoric acid. In subsequent experiments, substrates having higher pore volumes and using higher concentrations of phosphoric acid were employed.

EXAMPLE 2

Silica having a pore volume of about 0.86 cc./g. is impregnated with a 50% solution of $H_3PO_4$, sufficiently to yield 4 millimoles of acid per gram of support. The adsorption capacity was compared to that of untreated silica. The impregnated silica had approximately four times (400%) as much capacity for ammonia adsorption as the untreated substrate.

EXAMPLE 3

A commercially-available olefin polymerization catalyst, normally about 65% $H_3PO_4$ (w./w.) on kieselguhr, was titrated with 0.500 N NaOH and found to correspond 2.64 meg./g. or 26% $H_3PO_4$, assuming one proton titrated at pH=7. The rest of the acid was conceivably used up in reaction with the alumina values in the kieselguhr. Approximately 75 lbs. of this material were installed in a circulating air unit in a dog-room housing 32 beagles. Air was passed over the material at ca. 3000 c.f.m. and ammonia titers were measured in the room. These are shown in Table II below:

TABLE II. —Ammonia Removal

| No. of days of test: | Room $NH_3$ level (p.p.m.) |
|---|---|
| 0 | [1] 40 |
| 1 | 20 |
| 7 | 14 |
| 14 | 11 |
| 21 | 10 |
| 27 | 11 |
| 36 | 4 |

[1] Average of many readings.

EXAMPLE 4

A portion of silica gel powder is calcined at 1100° F., for one hour and 100 grams are weighed out. The pore volume is found to be 1.17 cc./g. An impregnating solution is prepared by dissolving 10.0 grams of $CrO_3$ and 20.0 grams of 85% $H_3PO_4$ in sufficient deionized water to make a volume of 117 cc. This solution is then added to the powder in small increments with periodic mixing to lend uniformity to the product. The finished wet product is dried at 110° C. for 2 to 3 hours and tabletted with ca. 1% graphite as a lubricant.

EXAMPLE 5

Silica tablets of ¼″ diameter and ⅝″ in length have a pore volume of 0.76 cc./g. A weighed portion is impregnated with a pore volume solution containing 1.5 millimoles of $CrO_3$ per cc. of 50% aqueous $H_3PO_4$. The impregnated tablets are dried at 110° C. for one hour, crushed and screened to give a 8–10 mesh fraction.

Prior to use, the same is analysed and is found to contain 5% by weight $CrO_3$. The remainder has presumably been deactivated by heating and by contact with organic compounds present in air.

Sample of equal volume of the chromic acid solid, 4.5% $KMnO_4$ on $Al_2O_3$ and 9.0% $KMnO_4$ on $Al_2O_3$ are then tested for their ability to remove methanol from a methanol-air stream. The chromic acid sample so tested is equal to or better than the 9% $KMnO_4$ preparation during the time of the test and both are superior to a plant-prepared 4.5% $KMnO_4$ sample. The test results are shown in Table III below:

TABLE III

| | Percentage of inlet methanol unconverted [2] | | |
|---|---|---|---|
| Exposure time (hours) | Conventional 4.5% $KMnO_4$ [1] | 9% $KMnO_4$ [1] | The invention 5% $CrO_3$ [1] |
| ½ | 9 | 21 | 0 |
| 18 | 58 | 37 | 39 |
| 22 | 100+ | 65 | 55 |
| 25 | 95 | 62 | 53 |

[1] Equal volumes of oxidant used.
[2] The gas employed contained about 0.004% methanol, and the flow rate was about 200 cc./min.

An additional advantage of the present invention over the prior art arises from the fact that prior art purifying materials are limited in the amount of oxygen that can be made available per unit weight of substrate. In contrast to this, chromic acid does not have this limitation because of its greater solubility. Additionally, mineral acids permit removal of ammonia, amines and other basic odorous compounds that are difficult or impossible to remove with prior art oxidants such as potassium permanganate. Also, the reduction of chromic acid leads to "soluble" compounds of lower oxidation state in contrast to the permanganate system where "insoluble" manganese dioxide results; therefore, the employment of chromium trioxide has the additional advantage that pore blockage is avoided.

EXAMPLE 6

The preparation and use of alkali-treated alumina in an air purification process is as follows:

Preparation 100 pounds of PA alumina extrudates (3/16″ dia.) are calcined at 1100° F. for one hour. The particles have a pore volume of 0.76 cc./g. (0.091 gal./lb.) and an apparent bulk density of 0.55 g./cc. In a separate container, 5.3 pounds of dry sodium hydroxide is slowly dissolved in about 8 gallons of demineralized water. The resulting solution is diluted to a final volume of 9.1 gallons and is charged to a $N_2$-pressured blow-case. The extrudates are placed in a drum with an open head on a drum-roller, and the drum is slowly rotated. The NaOH solution is delivered through a spray-nozzle onto the tumbling extrudates under a slight $N_2$ pressure until the pore volume of the particles is filled. After an additional 15 minutes of rolling, the drum-contents are emptied onto trays, dried at 250° F. for about four hours and packed in sealed containers. The dried extrudates typically contain about 10% moisture and about 4–5% NaOH.

Use

An apparatus is constructed permitting about 1,000 s.c.f./minute of air to pass through a pad of deodorizing material. This pad is typically 1⅞″ thick by 14″ wide by 20″ long. The air is pulled through the pad by means of a shrouded exhaust fan placed downstream of said pad. A second pad of similar dimensions as the first is interposed between the fan and the first pad. In this pad are placed sufficient $NaOH/Al_2O_3$ extrudates to fill the entire volume. The action of the second pad is to remove acidic gases produced or transmitted by the first.

A pad is typically made of two interlocking sheet metal frames, a screen of some sort on both faces and means to lock the two frames together. The pads described above have an approximate capacity of 525 cubic inches or 0.30 cubic foot.

EXAMPLE 7

A silica extrudate is prepared having a pore volume of 1.24 ml./g. A solution is prepared containing 4.0 millimoles $H_3PO_4$ (0.392 g. or 0.455 g. of 86% solution) per ml. of pore volume. For a 100-gram sample this is $$100 \times 1.24 \times 0.455 \text{ g.} = 56.5 \text{ g. of } 86\% \text{ } H_3PO_4$$

The sample is prepared by adding the acid solution diluted to the pore volume (124 ml.) to the silica. When all the solution is added, the pores of the silica particles are filled and the exterior surfaces appear wetted. After drying at 110° C. for several hours, the particles appear dry again. The particles, upon analysis, are found to contain 32.0% $H_3PO_4$.

A further limitation exists for air purifying materials containing $CrO_3$. This arises from the stoichiometry:

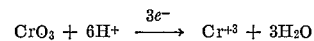

Six protons are consumed for each molecule of $CrO_3$ and these are furnished by the $H_3PO_4$ (1 proton/molecule) and $H_2SO_4$ (2 protons/molecule). In order to obtain maximum utilization of the $CrO_3$, it should not exceed 1.43 millimoles or 1.11 millimoles per milliliter of support pore volume when used in conjunction with sulfuric or phosphoric acids, respectively.

EXAMPLE 8

To another 100 grams of silica extrudates as in Example 1 is added a $CrO_3$-$H_2SO_4$ solution. This solution is prepared by mixing the following:

(a) 1.3 millimoles/ml. $CrO_3 \times 124$ ml. $\times 0.100$ g./mmole = 16.1 g. $CrO_3$ (b)

4.0 millimoles/ml. $H_2SO_4 \times 124$ ml. $\times$ $$\frac{0.098 \text{ g./mmole}}{0.964 \text{ (purity)}} = 50.5 \text{ g. } H_2SO_4 \text{ (conc.)}$$

We claim:
1. A method for removing methanol and ammonia pollutants from a gas which comprises contacting said gas with a siliceous substrate impregnated with an acid selected from the group consisting of phosphoric acid and sulfuric acid and a hexavalent chromium compound.
2. The method of claim 1 wherein said gas is further contacted with an alumina substrate impregnated with an alkaline material.
3. The method of claim 1 wherein said gas is air.

References Cited

UNITED STATES PATENTS

| | | | |
|---|---|---|---|
| 1,586,327 | 5/1926 | Perrott et al. | 23—4 |
| 1,595,788 | 8/1926 | Kerschbaum | 23—2 |
| 1,767,057 | 6/1930 | Dotter | 23—4 |
| 1,864,988 | 6/1932 | Downs | 252—193 |
| 2,033,698 | 3/1936 | Finn | 23—4 X |
| 2,569,092 | 9/1951 | Deering | 252—435 |
| 2,942,933 | 6/1960 | Batchelder et al. | 23—2 |
| 2,945,015 | 7/1960 | Detter | 252—435 X |
| 3,231,516 | 1/1966 | Gary | 252—437 |
| 3,324,165 | 6/1967 | Baer et al. | 252—458 X |

OSCAR R. VERTIZ, Primary Examiner

E. C. THOMAS, Assistant Examiner

U.S. Cl. X.R.

23—4, 196; 252—193, 435, 436, 450, 458